May 9, 1961 J. D. PEARSON ET AL 2,983,032
TESTING AND GRADING OF ELECTRIC FUSEHEADS
Filed Feb. 21, 1957 3 Sheets-Sheet 1

INVENTORS
JOHN DONALDSON PEARSON
NEIL HERBERT
CHARLES REID
JOHN BAYNE MORRISON
BY Cushman, Darby & Cushman
ATTORNEYS

INVENTORS
JOHN DONALDSON PEARSON
NEIL HERBERT
CHARLES REID
JOHN BAYNE MORRISON

BY Cushman, Darby & Cushman
ATTORNEYS

May 9, 1961   J. D. PEARSON ET AL   2,983,032
TESTING AND GRADING OF ELECTRIC FUSEHEADS
Filed Feb. 21, 1957   3 Sheets-Sheet 3
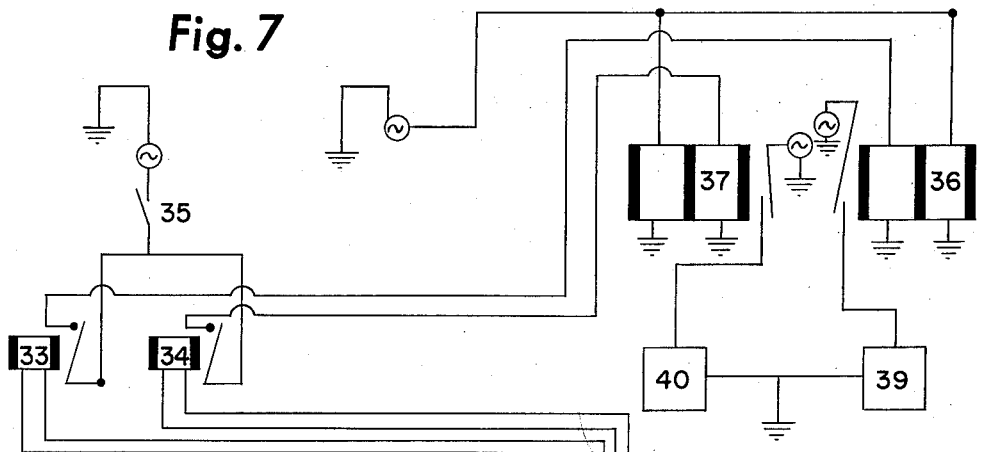
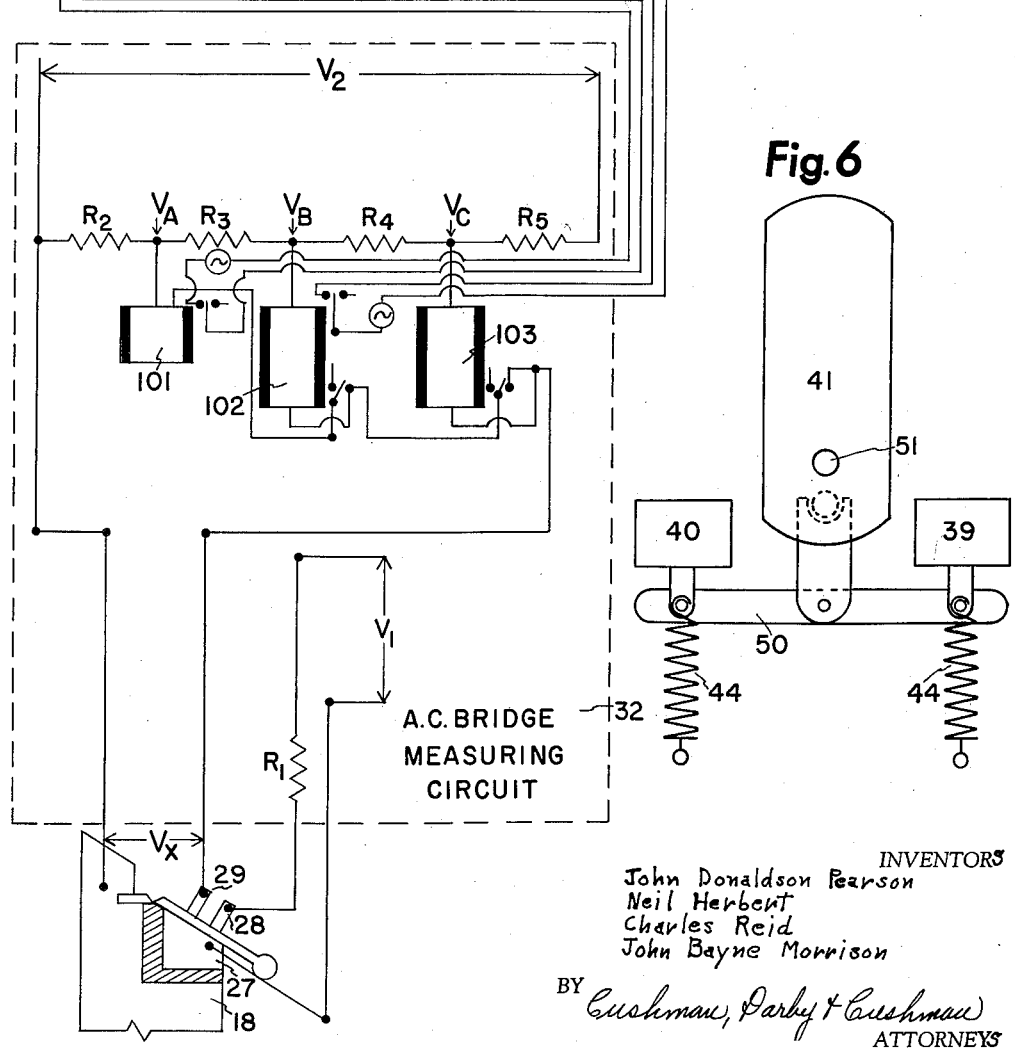
INVENTORS
John Donaldson Pearson
Neil Herbert
Charles Reid
John Bayne Morrison
BY Cushman, Darby & Cushman
ATTORNEYS

# United States Patent Office 2,983,032
Patented May 9, 1961

2,983,032
TESTING AND GRADING OF ELECTRIC FUSEHEADS

John Donaldson Pearson, Saltcoats, Neil Herbert, Largs, Charles Reid, Saltcoats, and John Bayne Morrison, Ardrossan, Scotland, assignors to Imperial Chemical Industries Limited, London, England, a corporation of Great Britain Filed Feb. 21, 1957, Ser. No. 641,746
Claims priority, application Great Britain Mar. 29, 1956
14 Claims. (Cl. 29—155.5)

The present invention relates to improvements in or relating to the production of low tension electric fuseheads from combs thereof and of the kind having two metal pole pieces separated by non-conducting material.

Said electric fuseheads may be of the kind which comprise two metal foil pole pieces separated by a sheet of non-conducting material so that a surface of each foil is united to an opposing surface of the sheet of non-conducting material and having the metal foil pole pieces connected together at one end by an electric resistance wire which is embedded in a bead of deflagrating composition. Electric fuseheads of the aforesaid kind are normally prepared by first cementing two rectangular metallic sheets which may be for example of brass one on each side of a sheet of non-conducting material such as cardboard. This assembly is then cut into two combs wherein the material from the spaces of one comb forms the teeth of the other comb. A fine resistance wire is next wound round the teeth of each comb and joined to the sheets of material near the ends of the teeth, for example by soldering to form the bridge wire at the end of each tooth. At the ends of the teeth prior to the application of the fine resistance wire the metal sheet and part of the thickness of the cardboard may be removed at one side to accommodate the required length of wire between the two metal sheets. The surplus resistance wire passing round the root portion of the teeth is then broken and removed and the combs are dipped in one or more compositions comprising a deflagrating composition, a thickening agent and a volatile solvent for the latter with evaporation of the solvent between each dipping so as to form a bead of deflagrating composition round the bridge wires after which the teeth are separated by cutting to give the finished product.

The electric fuseheads may also be of the kind composed of a pair of flat spaced metal strips which are bridged at one end by a resistance wire embedded in a bead of deflagrating composition and held together by a non-conducting element which fuseheads are made from a stamped continuous metal band.

The electrical resistance of a bridge wire of a low tension electric fusehead must be between definite limits and it is therefore necessary to subject each fusehead to a resistance test. Heretofore the testing of low tension electric fuseheads for their electrical resistance was carried out after they had been separated from their comb.

The object of the present invention is to provide a process and apparatus for the testing for electrical resistance of the bridge wire of each fusehead to be carried out while it is still a part of its comb so as to permit this testing to be carried out in a more convenient manner and also to permit the period of time required for the testing and grading of each fusehead with respect to its electrical resistance to be materially shortened.

According to the present invention the process for the production of electric fuseheads from combs thereof and of the kind having two metal pole pieces separated by non-conducting material comprises severing one metal pole piece of a fusehead from the strip of a comb and ensuring that the fusehead is electrically isolated from any other fusehead of the comb, determining the grade of electric resistance to which said fusehead belongs and storing the result of this determination, severing the fusehead from said strip and arranging for the stored determination to direct this fusehead into the path allocated for the determined grade of its electric resistance.

Preferably the severing of a metal pole piece of a fusehead from the strip of a comb and the ensuring that the thus treated fusehead is electrically isolated from any other fusehead of the comb are carried out as two separate operations. Furthermore, it is preferred that the two operations namely the operation comprising the determining of the grade of electric resistance to which the fusehead belongs and the storing of the result of this determination, and the operation of the severing of the fusehead from said strip should be carried out substantially concurrently on two consecutive fuseheads. When proceeding in this manner there can be used a simple method of storing the determination of the grade of electric resistance. Also, this procedure permits the time interval required to direct the fuseheads of a comb into the paths allocated for their determined grades of their electric resistance to be materially lessened.

In accordance with one embodiment of the present invention the process for the production of electric fuseheads from comb thereof and of the kind having two metal foil pole pieces separated by a sheet of non-conducting material so that a surface of each foil is united to an opposing surface of the sheet of non-conducting material and having one end of each metal foil pole piece connected together by an electric resistance wire, which is embedded in a bead of deflagrating composition, comprises severing a metal foil pole piece from the strip of a comb and ensuring that the fusehead is not electrically in parallel with any other fusehead of the comb, determining the grade of electric resistance to which said fusehead belongs and storing the result of this determination, severing the fusehead from said strip and arranging for the stored determination to direct this fusehead into the path allocated for the determined grade of its electric resistance.

Preferably in said embodiment of the invention the severing of a metal foil pole piece of a fusehead from the strip of a comb and ensuring that the thus treated fusehead is not electrically in parallel with any of the other fuseheads of the comb are carried out as two separate operations. Furthermore, it is also preferred in this embodiment of the invention that the two operations namely the operation comprising the determining of the grade of electric resistance to which the fusehead belongs and the storing of the result of this determination, and the operation of the severing of the fusehead from said strip should be carried out substantially concurrently on two consecutive fuseheads.

Preferably in said embodiment of the invention the severing of a metal foil pole piece from the strip of a comb is carried out in such a way that the non-conducting material between the two metal foil pole pieces is also cut but only through a portion of its thickness so that the fusehead can be bent out of its former position to ensure that it is not electrically in parallel with any of the other fuseheads of the comb when the resistance wire of the fusehead is tested for its electrical resistance.

It is also preferred in said embodiment of the invention to bend the fusehead back substantially into its former position after the testing of the electrical resistance of the resistance wire of the fusehead prior to the step of severing the fusehead from the strip and it is preferred to carry out this severing along a line substantially parallel to and nearer to the tip of the fusehead than the line on which the severing of the metal foil pole piece is performed.

Apparatus according to the invention comprises means for severing one metal pole piece of a fusehead from a strip of a comb of fuseheads and ensuring that the fusehead is not electrically in parallel with any other fusehead of the comb, means adapted to determine the grade of electric resistance to which the thus treated fusehead belongs, a device adapted to store the result of this determination and in association with said second mentioned means, means for severing the fusehead from said strip, and means adapted to respond to said device and in accordance with the determination stored by said device to direct the fusehead into the path allocated for the determined grade of its electric resistance.

Said means for severing the metal pole piece of the fusehead from the strip of a comb of fuseheads and the means for severing the fusehead from said strip are both preferably guillotines each of which can be adjusted to have the desired degree of travel.

The means adapted to determine the grade of electric resistance to which a fusehead belongs after one of its metal pole pieces has been severed from the strip of a comb of fuseheads and after ensuring that the fusehead is not electrically in parallel with any other fusehead of the comb can be for example an arrangement comprising in association four contact shoes, an alternating current bridge resistance measuring circuit, an electronic amplifying system and two electrical relays wherein the four contact shoes are electrically insulated from each other and are adapted to be placed two on each pole piece of a fusehead to be tested and to be in intimate contact with these pole pieces and wherein said contact shoes are connected to said alternating current bridge resistance measuring circuit which is adapted to determine to which one of two acceptable consecutive pre-set grades of resistance the resistance of the fusehead belongs and to energise through said electronic amplifying system that one of said two electrical relays which is for the determined grade and which if the resistance of the fusehead is either below or above said two acceptable grades of resistance does not affect either of these two electrical relays.

Said device which is adapted to store the result of the determination of the grade of electric resistance and which is in association with the means adapted to determine the grade of electric resistance of a fusehead and which is also in association with means adapted to respond in accordance with the determination stored by the device and so direct the fusehead after it is separated from the strip of its comb into the path allocated for the determined grade of its electric resistance can be for instance an arrangement comprising in association two electrical switches and two double coil electrical relays wherein the two electrical switches are synchronised and are adapted to perform the following operations wherein, towards the end of the period of time when a fusehead would be stationary in said means adapted to determine the grade of electric resistance one electrical switch closes and if the fusehead has an electrical resistance which is within one of the two acceptable consecutive pre-set grades of resistance permits the selected electrical relay of said means adapted to determine the grade of electric resistance to energise one of the coils of that one of said two double coil electrical relays which is for the determined grade for current to pass through this double coil electrical relay to the means for directing the fusehead after it has been severed into the path allocated for the determined grade of its electric resistance, wherein the second electrical switch opens and closes during the period of time the first electrical switch is closed and energises the second coil of said double coil relay and maintains it in the energised position until said second electrical switch again opens, and wherein the first electrical switch opens after the second one closes and before said fusehead would begin to leave said means adapted to determine the grade of electric resistance to isolate the electrical circuit for the means adapted to determine the grade of electric resistance from the means for directing the fusehead into the path allocated for the determined grade of electrical resistance.

The means which directs the fusehead after it is severed from its strip into the path allocated for the determined grade of its electric resistance in accordance with the determination stored by said device can be for instance a mechanism comprising a funnel, a conduit of rectangular cross section, springs and two solenoids wherein said funnel is arranged to direct a severed fusehead downwards, wherein said conduit is pivoted at its lower end portion to be rotatable in one plane through a small arc and is below said funnel so that when in its mean position said fusehead can pass through the conduit, when in one extreme position said fusehead is directed down the outer face of one of its walls and when in the other extreme position said fusehead is directed down the outer face of the opposite wall, and is actuated by either one or the other of said two solenoids through a linkage to hinge the conduit to one of said two extreme positions or by said springs to place the conduit in said mean position, and wherein each of said solenoids is connected to a different double coil electric relay in said device which is adapted to store the result of the determination of the grade of electric resistance of a fusehead.

In accordance with a preferred embodiment of the invention the apparatus has its cycle of operations controlled by a rotating shaft driven by an electric motor geared to a predetermined speed so that the rotating shaft through cams controls the various mechanical moving parts and two electrical switches wherein one of said electrical switches controls the transference of an electric current of short duration from an alternating current bridge measuring circuit to one of the solenoids which operates the means for directing the path of a fusehead severed from its comb and the other electrical switch maintains a current through the same solenoid until the cycle of operations is completed and wherein said two electrical switches furthermore are timed to the movements of the various mechanical moving parts that the means for directing a fusehead severed from its comb into its appropriate path operates for a period of time which ends just short of the period of time allocated to carry out the determination of the grade of an electrical resistance on an immediately preceding fusehead and that the operation of severing the fusehead is carried out approximately in the middle of the period of time during which the means for directing said fusehead severed from its comb is held in the position to direct said fusehead into its appropriate path.

According to the present invention the method of grading low tension electric fuseheads of the kind having two metal pole pieces separated by non-conducting material for their electrical resistance comprises severing one metal pole piece of fusehead from the strip of a comb and ensuring that the fusehead is electrically isolated from any other fusehead of the comb, determining the grade of electric resistance to which said fusehead belongs, severing the fusehead from said strip and directing this fusehead into the path allocated for the determined grade of its electric resistance.

Electric fuseheads which can be conveniently graded for their electric resistance according to the invention are of the kind having two metal foil pole pieces separated by a sheet of non-conducting material so that a surface of each foil is united to an opposing surface of the sheet of non-conducting material and having one end of each metal foil pole piece connected together by an electric resistance wire which is embedded in a bead of deflagrating composition.

Preferably in carrying out said grading of an electric fusehead according to the invention the determined grade of electric resistance is stored prior to severing the fusehead from said strip and the stored determination is arranged to direct this fusehead into the path allocated for the determined grade of its electric resistance.

The invention is illustrated with reference to the drawings wherein;

Figure 6 is a diagrammatic side elevational view of the sorting apparatus shown in dotted lines in Figure 4.

Figure 7 is a schematic wiring diagram of the electrical circuit of the invention.

Figure 1:
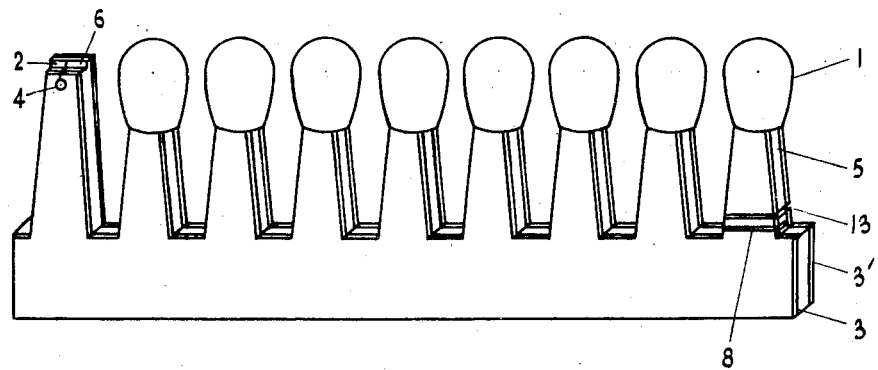
Figure 1 is a pictorial view of one kind of comb of fuseheads on which the invention can be performed.

In Figure 1 the left hand fusehead is shown with bead of deflagrating composition 1 which surrounds bridge wire 2 removed so as to show the arrangement of the bridge wire 2 soldered to the metal foil pole pieces 3 and 3'. The bridge wire 2 is shown soldered to the sheet of metal foil 3 at 4. A portion of the sheet 3 and of insulating material 5 sandwiched between and cemented to the sheets of metal foil 3 and 3' are cut away at 6 to accommodate the required length of bridge wire 2.

Figure 2:
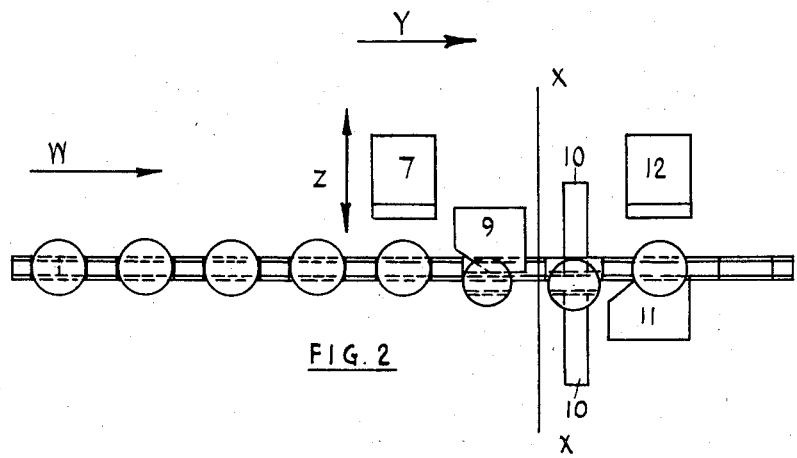
Figure 2 is a diagrammatic side elevation of said comb of fuseheads being subjected to an embodiment of the process of the invention and Figure 3 is a section in line X—X (looking in the direction of arrow Y) in Figure 2.
Figure 3:
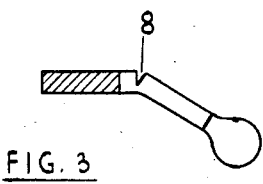

In Figure 2 a guillotine 7 is caused to reciprocate in the direction of the double headed arrow Z and on each downward stroke cuts through the top metal sheet 3 and into the insulating material of successive fuseheads (as shown at 8 in Figure 1 and in Figure 3) of a comb fed synchronously with said guillotine in the direction of arrow W. After being thus partially severed from the remainder of the comb each fusehead in turn passes under a guide 9 (which causes it to bend to the position shown in Figure 3) in which position the electrical resistance of the bridge wire is determined by the device 10. After passing over a guide 11 adapted to bend the fusehead back into its previous position in the comb a further guillotine 12 reciprocating simultaneously to guillotine 7 severs the fusehead from the comb at 13. The fusehead so severed is then directed into an appropriate receptacle, in accordance with the determination made by the device 10, by means described below.

Preferably the operations carried out by device 10 and guillotine 12 are effected concurrently on two consecutive fuseheads.

Figures 4, 5:
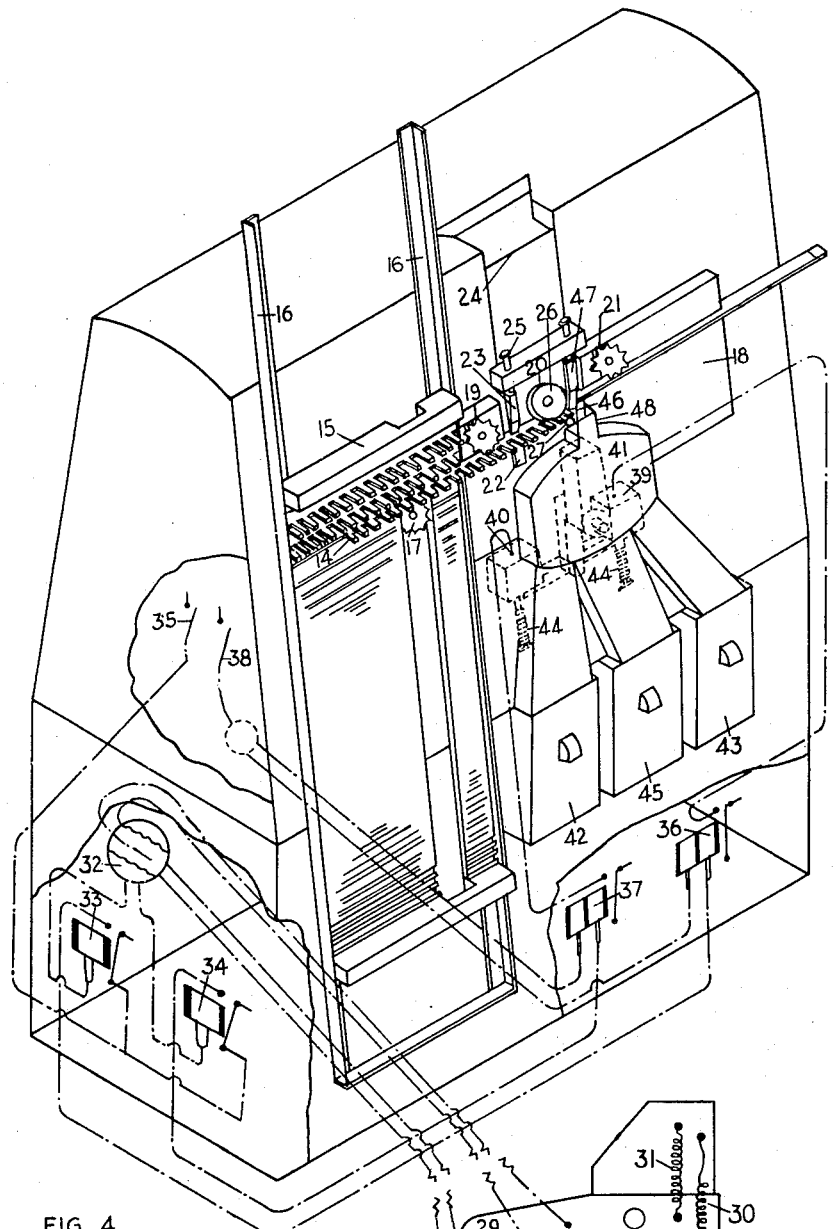
Figure 4 is a perspective view of the preferred embodiment of the invention.
Figure 5 is an enlarged view of a portion of the apparatus shown in Figure 4, namely the four contact shoes.

Referring to Figure 4 the cycle of operations of the apparatus illustrated therein is controlled by a rotating shaft (not shown) driven by an electric motor (not shown) geared to a predetermined speed so that the rotating shaft through cams controls the various mechanical moving parts and the two electrical switches of the apparatus. One of said electrical switches controls the transference of an electric current of short duration from the alternatiing current bridge measuring circuit to one of the solenoids which operates the means for directing the path of a fusehead severed from its comb and the other electrical switch maintains a current through the same solenoid until the cycle of operations is completed. Said two electrical switches furthermore are timed to the movements of the various mechanical moving parts so that the means for directing a fusehead severed from its comb into the appropriate collector box operates for a period of time which ends just short of the period of time allocated to carry out the determination of the grade of electrical resistance on an immediately preceding fusehead and that the operation of severing the fusehead is carried out approximately in the middle of the period of time during which the means for directing said fusehead severed from its comb is held in the position to direct said fusehead into the appropriate collector box.

In Figures 4 and 5 fusehead combs 14 of the kind illustrated in Figure 1 are arranged in suitable slots in magazine 15 which can be removed from the apparatus for loading. When placed in the apparatus the magazine 15 is free to slide in an inclined plane so that its path is controlled by guides 16 and its descent is arrested by a sprocket wheel 17 which supports the magazine 15 through the lowest fusehead comb therein. The fusehead comb is indexed out of the magazine 15 in steps of length equal to the pitch of the fuseheads on the comb by the sprocket wheel 17 into the comb guide block 18 which positions each comb of fuseheads as it is indexed through the apparatus progressively by sprocket wheels 19, 20 and 21 each synchronized to sprocket wheel 17. Each consecutive fusehead as it passes through the apparatus is operated on as follows.

In the first operating position a fusehead rests on top of anvil 22 and a knife 23 clamped to slide 24 is positioned by adjusting screw 25 so that at the bottom of the stroke of slide 24 knife 23 severs the top pole piece of the fusehead and cuts partially through the insulating material.

The fusehead is fed into the second operating position where it is folded downwards out of the original plane of the fusehead on the comb and about the line of the partial cut performed on the fusehead in the first operating position by a roller 26 in the shape of an inverted frustum attached to the front face of sprocket wheel 20 thus ensuring that the top pole piece of the fusehead is electrically insulated from the top pole piece of the other fuseheads on the comb.

The fusehead is fed into the third operating position where the comb guide block 18 acts as one electrical contact shoe and is electrically insulated from an electrical contact shoe 27 and where both are in intimate contact with the bottom pole piece of the fusehead, and where hinged electrical contact shoes 28 and 29, electrically insulated one from the other, are in intimate contact with the top pole piece of the fusehead under the action of springs 30 and 31.

Contact shoes 18, 27, 28 and 29 are connected to an alternating current bridge measuring circuit 32 including an electronic amplifying system and which is adapted to determine to which one of two acceptable consecutive preset grades of resistance, namely for example 0.9–1.3 ohms and 1.3–1.6 ohms, the resistance of the fusehead belongs and to energize the one of two electrical relays 33 and 34 which is for the determined grade and which if the resistance is either below or above said two acceptable grades of resistance does not energize either of the two electrical relays 33 and 34.

The alternating bridge measuring circuit and amplifier 32 may be of any conventional or known design capable of serving the purposes of this invention, and, as such, does not form a part of the invention.

For example, suitable circuitry is shown in Figure 7. The resistance bridge is a modification of the opposition method described, for instance, by Karo in Electrical Measurements (1950), Part 1, pages 47–49 including a switching circuit for operating relays 33 and 34 according to the resistance of the fusehead.

The system employs two fixed voltage sources V1 and V2. V1 supplies a current I, to the unknown resistance of the fusehead through a resistor $R_1$, via the contacts 27 and 28. Disregarding the voltage comparison circuit connected to the contacts 18 and 29, if $R_1$ is very much greater than resistance of the fusehead, the voltage drop $V_x$ across the fusehead will be proportional to the fusehead resistance and will be very little affected by contact resistance at 27 and 28 provided these are small in comparison to $R_1$. In a typical case V1 is 100 volts, $R_1$ is 2,500 ohms and the fusehead resistance is a maximum of 5 ohms.

It will be seen that, provided the composite impedance of the voltage comparison circuit when disconnected from the fusehead resistance is very much greater than the fusehead impedance the presence of this circuit connected across the fusehead resistance will not materially affect the voltage V$x$. Moreover, contact resistance at the contacts 18 and 29 will cause very little reduction in the voltage applied to the comparison circuits.

Consider that the resistance ranges into which it is required to grade the fuseheads are R$a$ to R$b$ and R$b$ to R$c$.

When $Rx=Ra$ let $Vx=Va$
When $Rx=Rb$ let $Vx=Vb$
When $Rx=Rc$ let $Vx=Vc$

Three reference voltages V$a$, V$b$ and V$c$ are derived from the supply V2 applied across resistances $R_2$, $R_3$, $R_4$ and $R_5$ in series as shown, and three detector relay circuits 101, 102 and 103 are connected as shown. The detector relays are such that when V$x$ is less than the reference voltage (V$a$, V$b$ or V$c$) to which they are connected, the relay will not be energized and when V$x$ exceeds the reference voltage, the relay will be energized. Thus When V$x$ is less than V$a$, no relays will be energized;
When V$x$ is greater than V$a$, relay 101 is energized;
When V$x$ is greater than V$b$, relay 102 is energized and 101 is de-energized due to the contact controlled by 102;
When V$x$ is greater than V$c$, relay 103 is energized and 102 is de-energized due to the contact controlled by relay 103.

Thus when V$x$ is in the range V$a$ to V$b$, i.e. the fusehead resistance is in the range R$a$ to R$b$, relay 101 is energized and when V$x$ is in the range V$b$ to V$c$, the fusehead resistance is in the range R$b$ to R$c$, relay 103 is energized. When the fusehead resistance is smaller than R$a$ or larger than R$c$, neither of relays 101 and 102 is activated.

The relays 101 and 102 are respectively connected through a power supply to operate relays 33 and 34 when they are energized.

Towards the end of the period of time when the fusehead is stationary in this third operating position electrical switch 35 closes and if the fusehead has an electrical resistance which is within one of the two acceptable consecutive pre-set grades of resistance permits the selected electrical relay 33 or 34 to energise one of the coils of that one of the two double coil electrical relays 36 or 37 which is for the determined grade of its electric resistance. The electrical switch 38 then opens and closes during the time electrical switch 35 is closed and energises only the second coil of the double coil relay 36 or 37, whose first coil has been energised, thus maintaining it in the energised position until electrical switch 38 opens again. Each of the double coil relays 36, 37 may be of conventional design wherein both of its coils must be activated for it to close its associated switch, but wherein activation of either coil alone will maintain the associated switch closed.

Electrical switch 35 opens after electrical switch 38 closes and isolates the electrical relays 33 and 34 from the coils of the double coil relays 36 and 37. The electrical circuit may be best understood by reference to the schematic wiring diagram in Figure 7.

When the double coil relay 36 or 37 is energised current passes through the contacts of the energised relay to the appropriate solenoid 39 or 40. Solenoids 39 and 40 act separately, through suitable linkage 50, as more clearly shown diagrammatically in Figure 6, on a conduit of rectangular cross section 41 pivoted at its lower end at 51 and rotatable in one plane through a small arc to hold it in two extreme positions. Solenoid 39 acts on the conduit so that the severed fusehead is directed down the outside face of the conduit to collector box 42. Solenoid 40 acts on the conduit so that the severed fusehead is directed down the opposite face of the conduit to collector box 43.

If the fusehead has an electrical resistance outside the two acceptable consecutive pre-set grades of electrical resistance then the conduit 41 is acted on by springs 44 to bring the conduit to the mean position where the severed fusehead is directed through the conduit to collector box 45.

After electrical switch 35 opens the fusehead is indexed forward one step into the fourth operating position. In moving into this position the presence of anvil 46 provides a guide to return the fusehead to approximately its original plane in the comb.

In the fourth operating position a knife 47 clamped to slide 24 severs the fusehead from the comb on the downward stroke of slide 24, the fusehead being severed on a line parallel to and nearer to the tip of the fusehead than the line on which the severing of the top metal foil pole piece was performed.

The severed fusehead drops freely through funnel 48 into the appropriate collector box as directed by conduit 41.

The operation of cutting of the fusehead is timed to occur approximately midway between two consecutive closings of the electrical switch 35.

The waste stub of the comb is fed past sprocket wheel 21 into some suitable receptacle (not shown).

Said apparatus permits the grading for electrical resistance of at least 270 fuseheads per minute.

What we claim is:

1. In the sorting by predetermined resistance characteristics of electric fuseheads from unitary combs of fuseheads of the kind comprising two metal pole pieces separated by non-conducting sheet material, the process which comprises the operations of: severing the metal pole pieces on one side of each fusehead from the continuous metal strip on that side of a comb; bending each fusehead out of the plane of the comb so that it is out of electrical connection through the metal on the cut side with any other fusehead of the comb; applying a testing voltage across the so-partially severed and bent fuseheads fed to a testing position successively by travel of the comb; severing the successive fuseheads from the comb; and guiding each severed fusehead into one of a number of predetermined paths according to its electrical resistance in accordance with the current flowing through the fusehead on the application of the testing voltage.

2. A process as claimed in claim 1 wherein the electric fuseheads are of the kind wherein the ends of each of their two metal foil pole pieces are connected together by an electric resistance bridge wire embedded in a bead of deflagrating composition.

3. A process as claimed in claim 1 wherein a portion only of the non-conducting sheet material between the two metal foil pole pieces as well the the metal foil pole piece on one side is cut through in the first-mentioned severing operation.

4. A process as claimed in claim 1 wherein each partially severed fusehead is bent back substantially into its former position after the testing of its electrical resistance and before it is completely severed from the comb.

5. A process as claimed in claim 1 wherein the line along which the final severance of the fuseheads from the comb takes place is substantially parallel to and nearer to the tips of the fuseheads than the line along which the first severing of the metal foil pole pieces on one side is performed.

6. A process as claimed in claim 1 wherein the operation of bending the teeth out of the plane of the comb is carried out successively on the individual fuseheads during the passage of a comb moving past the bending means.

7. A process as claimed in claim 1 wherein the partial severing operation is carried out successively on the individual fuseheads during the passage of a comb moving past the partial severing means.

8. A process as claimed in claim 1 wherein the partial severing operation, the bending operation and the subsequent operations of applying a test voltage, of severing the fuseheads and of guiding them are successively performed on fuseheads of the same moving comb, the frequency of said operations being synchronized for the purpose with each other and with the movement of the comb.

9. Apparatus suitable for the production of electric fuseheads of predetermined resistance characteristics from unitary combs of fuseheads of the kind comprising two metal pole pieces separated by non-conducting sheet material, said apparatus comprising means for severing the metal pole pieces on one side of each fusehead from the continuous metal strip on that side of a comb, means for bending each fusehead out of the plane of the comb so that it is out of electrical connection through the metal on the cut side with any other fusehead of the comb, means for applying a test voltage across the so-partially severed and bent fuseheads fed to the testing position successively by travel of the comb, means for severing the successive fuseheads from the comb, means for guiding each severed fusehead into one of a number of predetermined paths according to its electrical resistance, and means operatively connected to said guiding means and selectively responsive to the current flowing through the fusehead on the application of the test voltage to operate said guiding means.

10. Apparatus as claimed in claim 9 wherein said means for severing the metal pole pieces on one side of each fusehead from the continuous metal strip on that side of a comb, and the means for severing the successive fuseheads from the comb are both guillotines with means being provided whereby each of said guillotines can be adjusted to have the desired degree of travel.

11. Apparatus as claimed in claim 9 wherein the means for applying the testing voltage comprise in association, four contact shoes, an alternating current bridge resistance measuring circuit, an electronic amplifying system and two electrical relays wherein the four contact shoes are electrically insulated from each other and are adapted to be placed two on each pole piece of a fusehead to be tested and to be in intimate contact with these pole pieces, and wherein said contact shoes are connected to said alternating current bridge resistance measuring circuit which is adapted to determine to which one of two acceptable consecutive pre-set grades of resistance the resistance of the fusehead being tested belongs and to energize through said electronic amplifying system that one of said two electrical relays which is for the determined grade and which if the resistance of the fusehead is either below or above said two acceptable grades of resistance does not energize either of these two electrical relays.

12. Apparatus suitable for the production of electric fuseheads of predetermined resistance characteristics from unitary combs of fuseheads of the kind comprising two metal pole pieces separated by non-conducting sheet material, said apparatus comprising means for severing the metal pole pieces on the side of each fusehead from the continuous metal strip on that side of the comb, means for bending each fusehead out of the plane of the comb so that it is out of electrical connection through the metal on the cut side with any other fusehead of the comb, means for applying a test voltage across the so-partially severed and bent fuseheads fed to the testing position successively by travel of the comb, means for severing the successive fuseheads from the comb and for guiding each severed fusehead into one of a number of predetermined paths according to its electrical resistance.

13. Apparatus as claimed in claim 12, having, interposed between the means for applying a test voltage and the means for severing the successive fuseheads from the comb, means for bending each fusehead substantially back into the plane of the comb.

14. Apparatus as claimed in claim 12 wherein said means for severing the metal pole pieces on one side of each fusehead from the continuous metal strip on that side of a comb, and the means for severing the successive fuseheads from the comb are both guillotines with means being provided whereby each of said guillotines can be adjusted to have the desired degree of travel.

References Cited in the file of this patent

UNITED STATES PATENTS

| 720,073 | Schmitt et al. | Feb. 10, 1903 |
| 2,327,484 | Ashcroft | Aug. 24, 1943 |
| 2,417,488 | Handforth et al. | Mar. 18, 1947 |
| 2,468,843 | Sunstein | May 3, 1949 |
| 2,479,051 | Sunstein | Aug. 16, 1949 |

FOREIGN PATENTS

| 105,985 | Australia | Nov. 28, 1938 |